April 19, 1938.  P. E. ERICKSON  2,114,663
SAFETY STEERING POST FOR AUTOMOBILES
Filed Jan. 23, 1937
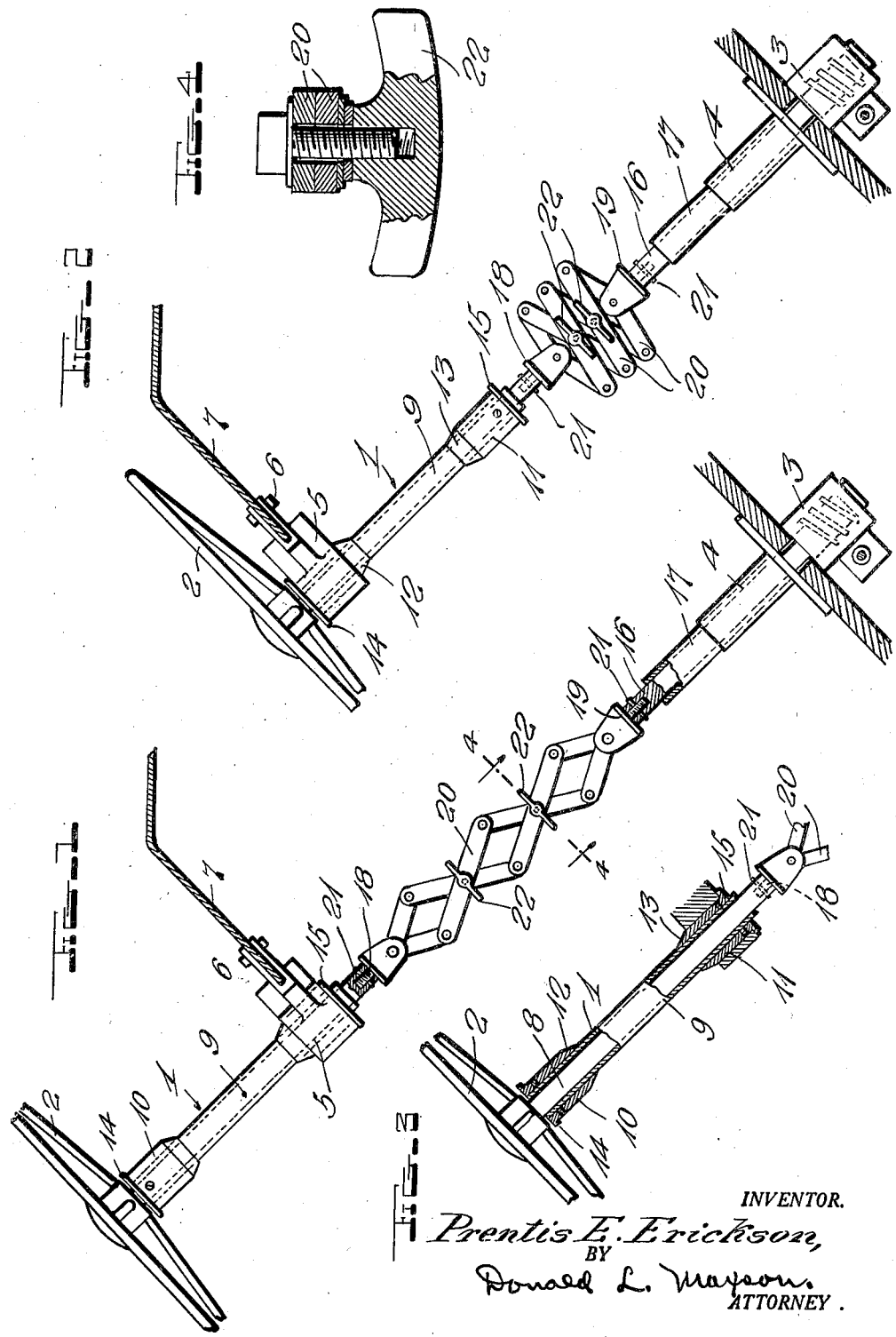
INVENTOR.
Prentis E. Erickson,
BY
Donald L. Mayson.
ATTORNEY.

Patented Apr. 19, 1938

2,114,663

UNITED STATES PATENT OFFICE 2,114,663

SAFETY STEERING POST FOR AUTOMOBILES

Prentis E. Erickson, Minneapolis, Minn., assignor to James B. Bradshaw, Minneapolis, Minn.

Application January 23, 1937, Serial No. 122,053

6 Claims. (Cl. 74—493)

This invention relates to improvements in automobile steering mechanisms, and more particularly to an improved steering post or column construction which will perform a dual purpose, first, that of providing a steering wheel supporting post which will be capable of forward movement from the normal or driving position to a position adjacent the dash of the automobile in the event of a collision, thereby preventing the driver from being injured or crushed against the wheel, and second, the adjustability of the steering post and steering wheel provides ready and unobstructed access to the driver's seat when the post is pushed to its forward position, after which the steering wheel may be pulled back to the proper driving position, and the adjustable holding means tightened.

An object of the invention is to provide an improved steering post or column which will be axially adjustable, and which will normally be held in the desired position until some undue pressure is placed on the steering wheel, such as for example, when a collision is experienced, at which time the forward movement of the person holding the steering wheel will be somewhat retarded, while the forward bearing of the post is slipping from its collar, and then the steering wheel will quickly move forward to a position immediately adjacent the dash of the automobile, whereupon the rear bearing of the steering post impinges against and finally slides into the collar supported by the said dash.

Another object of the invention is to provide an improved axially adjustable steering post for automobiles which will be a positive safety device for preventing the driver of the automobile from being crushed or injured due to the terrific impact against the steering wheel caused by a collision.

A still further object of the invention is to provide an improved axially adjustable steering post for automobiles which will be highly efficient in operation, and which will be quite inexpensive to manufacture.

Other objects will appear as the description proceeds.

In the accompanying drawing which forms a part of my application,

Figure 1 is a side elevation, partly in section of my improved axially adjustable safety steering post;

Figure 2 is a side elevation, partly in section of my improved safety steering post showing the same in its forwardmost or retracted position with the steering wheel adjacent the automobile dash;

Figure 3 is a detail view, partly in section showing the spaced bearing construction for the steering post, and Figure 4 is a sectional view taken on the line 4—4 of Figure 1.

Like characters of reference are used throughout the following specification and the accompanying drawing to designate corresponding parts.

In carrying out my invention, I provide an improved safety steering post or column for an automobile, which is generally denoted by the numeral 1. A steering wheel 2 is secured to the outer or rear end of the post 1, while the forward or inner end of the post carries the usual steering box 3, and floor brace 4 for holding the steering post, said brace being shown in the form of a collar provided with an enlarged flange at its lower end. A bearing collar 5 is suitably secured by the bolts 6 to the automobile dash 7, as clearly illustrated in Figures 1 and 2 of the drawing.

The outer end of the steering post comprises a central shaft 8 which is free to turn in a tubular body or casing 9, which in turn carries at its opposite ends the elongated adjustable bearing elements 10 and 11, the approach ends of which are tapered as at 12 and 13, respectively. The bearing elements 10 and 11 are further provided with the annular flanges 14 and 15 for limiting the axial movement of the steering post. It will be understood from the drawing that the steering post is normally in the position illustrated in Figure 1, but in the event of a collision or when unobstructed access to or from the driver's seat is desired, the steering post and steering wheel is pushed or moved forwardly to the position illustrated in Figure 2.

The forward or inner construction of the steering post comprises a shaft 16 which is in axial alinement with the shaft 8, which is rotatably mounted in the bearing collar 17 supported in the floor brace or collar 4. The adjacent ends of the shafts 8 and 16 are drilled and internally threaded as shown in Figure 1, and receive the threaded head members 18 and 19 pivoted at the opposite ends of the lazy tong 20, thereby providing a substantial and adjustable connecting medium between said shafts. Cross pins 21 will extend through the ends of the shafts 8 and 16, and through the threaded ends of the head members 18 and 19 when in operative position, thus preventing accidental separation or detachment of the several parts. I have provided a pair of clamping bolts having thumb operated nuts 22 for clamping the lazy tong 20 in the desired extended position, which adjustment and clamping may be readily accomplished from the driver's seat in the automobile.

From the foregoing description, it will be apparent that the steering wheel and steering post may be readily moved forward to a position adjacent the dash when the driver desires to get into or out of the automobile without having to squeeze into or out of the same, as is necessary with steering wheels and mechanisms which are not adjustable. It will be further seen that I have provided a highly efficient safety steering arrangement, as the steering post may be pulled back to the desired position and the thumb nuts 22 clamped to hold the lazy tong in its extended position, but just as soon as any undue strain or jamming of the steering wheel and post in a forward direction is effected, the steering wheel and steering post moves forwardly operating against the tension of the clamps on the lazy tong which acts as a brake, until they reach their forwardmost position adjacent the dash of the automobile. In this manner, the crushing or injuring of a person driving an automobile when in a collision is prevented.

It will be understood that many minor changes in detail of construction may be resorted to without departure from the spirit of the invention.

Having thus described my invention what I claim as new and desire to secure by Letters Patent of the United States is:

1. An axially adjustable steering post for automobiles including a lazy tong and upper and lower shafts secured at the ends thereof, a tubular casing provided with frictionally retained bearings at its extremities, and said upper shaft being supported in said casing.

2. The subject matter as set forth in claim 1, and said upper and lower shafts and lazy tong being alined.

3. The subject matter as set forth in claim 1, and a cooperating supporting collar adapted to selectively receive either of said bearings.

4. An axially adjustable steering post for automobiles including a lazy tong and upper and lower shafts secured at the ends thereof, a tubular casing provided with frictionally retained tapered bearings at its extremities, and said upper shaft being supported in said casing.

5. The subject matter set forth in claim 4, and means for limiting the endwise movement of said casing and upper shaft.

6. The subject matter as set forth in claim 4, and means for holding the lazy tong in the desired adjusted position.

PRENTIS E. ERICKSON.